(12) United States Patent
Asai

(10) Patent No.: US 10,012,889 B2
(45) Date of Patent: Jul. 3, 2018

(54) ELECTRONIC APPARATUS HAVING SEAL CONSTRUCTION AT MATCHING SECTION OF EXTERNAL MEMBERS

(71) Applicant: CANON KABUSHIKI KAISHA, Tokyo (JP)

(72) Inventor: Yoshikazu Asai, Chigasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/611,140

(22) Filed: Jun. 1, 2017

(65) Prior Publication Data

US 2017/0351165 A1    Dec. 7, 2017

(30) Foreign Application Priority Data

Jun. 3, 2016 (JP) ................................. 2016-111697

(51) Int. Cl.
*G03B 17/08* (2006.01)
*H04N 5/225* (2006.01)

(52) U.S. Cl.
CPC .......... *G03B 17/08* (2013.01); *H04N 5/2252* (2013.01)

(58) Field of Classification Search
CPC .......... H04N 5/23219; H04N 5/23212; H04N 5/23293; H04N 5/2353
See application file for complete search history.

(56) References Cited

U.S. PATENT DOCUMENTS

| 8,610,842 | B2* | 12/2013 | Kim | H04N 5/2257 348/333.08 |
| 9,545,140 | B1* | 1/2017 | Johnson | A45C 11/00 |
| 2011/0058805 | A1* | 3/2011 | Asai | G03B 17/02 396/535 |

FOREIGN PATENT DOCUMENTS

| JP | 64-029568 U | 2/1989 |
| JP | 2005-037921 A | 2/2005 |

* cited by examiner

*Primary Examiner* — Tuan Ho
(74) *Attorney, Agent, or Firm* — Cowan, Liebowitz & Latman, P.C.

(57) ABSTRACT

An electronic apparatus which is capable of reducing the number of parts and assembling man-hours of a seal construction of an matching section of external covers, and making seal performance stable while realizing downsizing of the apparatus. The electronic apparatus has a first external cover, a second external cover abutting to the first external cover through a matching section, a seal member disposed at the matching section, a gap disposed at the matching section on an external side of the electronic apparatus with respect to the seal member, and a third external cover fitted to the first external cover and the second external cover so as to partially cover the seal member. The seal member has, at a part of the gap partially covered by the third external cover, a protruding portion abutting to the third external cover to seal the part of the gap.

9 Claims, 12 Drawing Sheets

ELECTRONIC APPARATUS HAVING SEAL CONSTRUCTION AT MATCHING SECTION OF EXTERNAL MEMBERS

BACKGROUND OF THE INVENTION

Field of the Invention

The invention relates to an electronic apparatus, especially to an electronic apparatus, having a seal construction at an abutment section of external members, including an image pickup apparatus such as a digital camera and a digital video camera.

Description of the Related Art

An electronic apparatus such as a digital camera may have a drip-proof function of preventing a drop of water, etc., from entering the camera when used out of doors, etc. Conventionally, there is proposed a technique of, in a battery adapter of a camera, e.g., disposing a loop-like waterproof seal between an upper cover and a lower cover of the battery adapter to thereby realize a drip-proof function (see Japanese Laid-Open Patent Publication (Kokai) No. 2005-37921, for example).

However, the battery adapter described in Japanese Laid-Open Patent Publication (Kokai) No. 2005-37921 has the loop-like waterproof seal disposed at whole circumferences of a matching section between the upper cover and the lower cover, which increases a size of the waterproof seal and requires to cause any one of the covers to have a space in which a seal groove is disposed at whole circumferences of the matching section. Moreover, the waterproof seal is shaped in loop and bent partially, which may, when fitting the waterproof seal from a certain end of the matching section, easily create pasting-misalignment, take time to the pasting operation with the assembling man-hours increased, and further provide variations in seal performance according to the worker's level of skill.

SUMMARY OF THE INVENTION

The invention provides an electronic apparatus which is capable of reducing the number of parts and assembling man-hours of a seal construction of an matching section of external covers, and making seal performance stable while realizing downsizing of the apparatus.

In an aspect of the invention, there is provided an electronic apparatus comprising: a first external cover; a second external cover abutting to the first external cover through a matching section; a seal member disposed at the matching section and adapted to seal the matching section; a gap disposed at the matching section on an external side of the electronic apparatus with respect to the seal member; and a third external cover fitted to the first external cover and the second external cover so as to partially cover the seal member disposed at the matching section and the gap, wherein the seal member has, at a part of the gap partially covered by the third external cover, a protruding portion abutting to the third external cover to seal the part of the gap.

According to the invention, it is capable of reducing the number of parts and assembling man-hours of the seal construction of the abutment section of the external covers, and making the seal performance stable while realizing downsizing of the apparatus.

Further features of the invention will become apparent from the following description of exemplary embodiments with reference to the attached drawings.

DESCRIPTION OF THE EMBODIMENTS

An embodiment of the invention will now be described in detail with reference to the attached drawings.

Figure 1A:
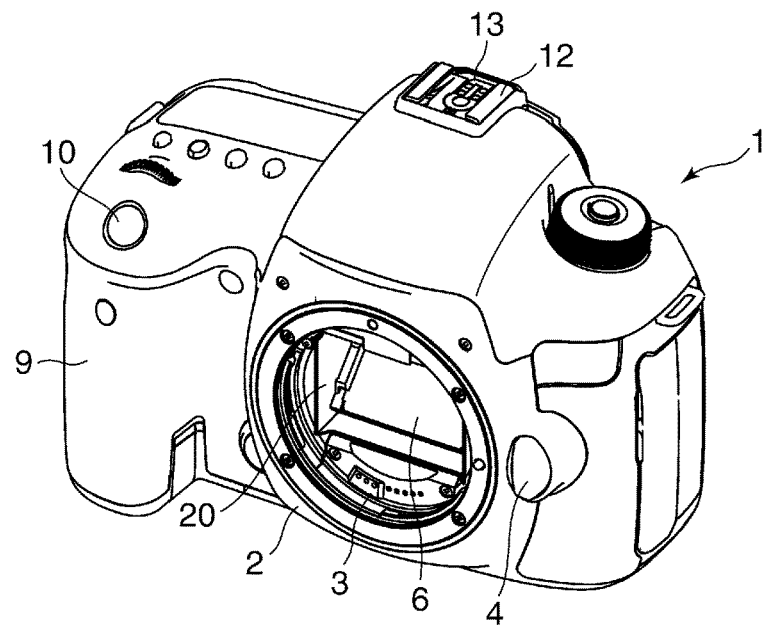
FIGS. 1A and 1B are perspective views of a digital single-lens reflex camera as an example of an embodiment of an electronic apparatus according to the invention, respectively.
Figure 1B:
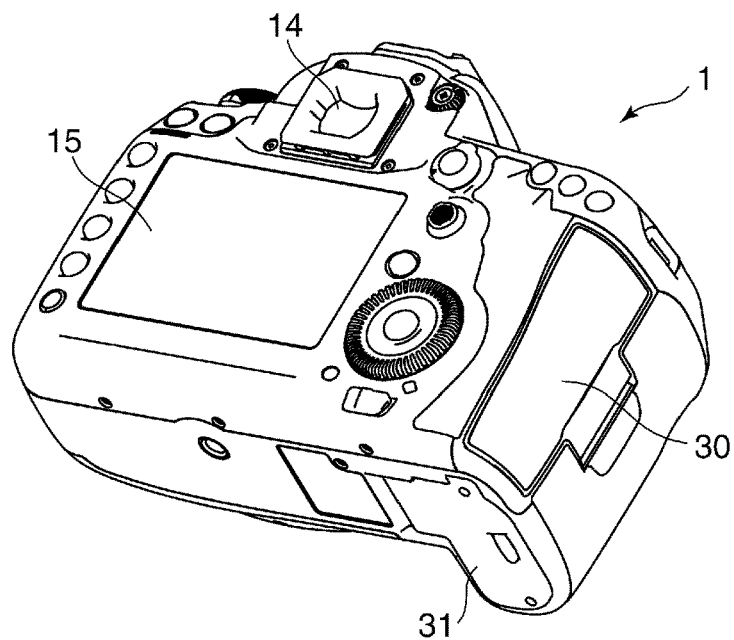

FIG. 1A is a perspective view of a digital single-lens reflex camera as an example of an embodiment of an electronic apparatus according to the invention as viewed from a front side (on an object side) of the camera, and FIG. 1B is a perspective view of the digital single-lens reflex camera shown in FIG. 1A as viewed from a back side of the camera. Moreover, the present embodiment exemplifies a digital single-lens reflex camera, which is directed to an example of an image pickup apparatus, as an electronic apparatus of the invention.

A digital single-lens reflex camera according to the present embodiment (hereinafter referred to as "the camera") 1 has, on a front side thereof, a mount section 2 to which a lens unit (not shown) is detachably attached. On the mount section 2 is disposed a mount contact 3 which enables the camera 1 and the lens unit to communicate control signals, state signals, and data signals with each other and supplies electric power to the lens unit. The camera 1 has a lens release button 4 disposed in the vicinity of the mount section 2, and depression of the lens release button 4 enables the lens unit to be removed.

The camera 1 has therein a mirror box 20 which is rotatably supported between a mirror down position at which a mirror unit 6 enters a photographing optical path and a mirror up position at which the mirror unit 6 retracts from the photographing optical path. The mirror unit 6 reflects a light flux of an object having passed through a photographing optical system of the lens unit to lead the light flux to a finder optical system (not shown), and leads the light flux to an image pickup device.

A grip section 9 is disposed on a left side section of the camera 1 as viewed from a front side of the camera 1. The grip section 9 has a release button 10 through which a photographer instructs a photographing to the camera 1. The camera 1 has a flash mounting-shoe gutter 12 and a flash contact 13 disposed on an upper section thereof.

As shown in FIG. 1B, the camera 1 has a display monitor 15, such as an LCD, disposed on a back side thereof and a finder ocular window 14 above the display monitor 15 on the back side thereof. Through the finder ocular window 14, a photographer can view the light flux of the object reflecting at the mirror unit 6 to be led to the finder optical system. The camera 1 has a card lid 30, for openably and closably covering a card slot, in which a memory card is detachably mounted, disposed on a right side section thereof as viewed from a back side of the camera 1, and a battery lid 31, openably and closably covering a battery housing section, disposed at a bottom section thereof.

Figure 2:
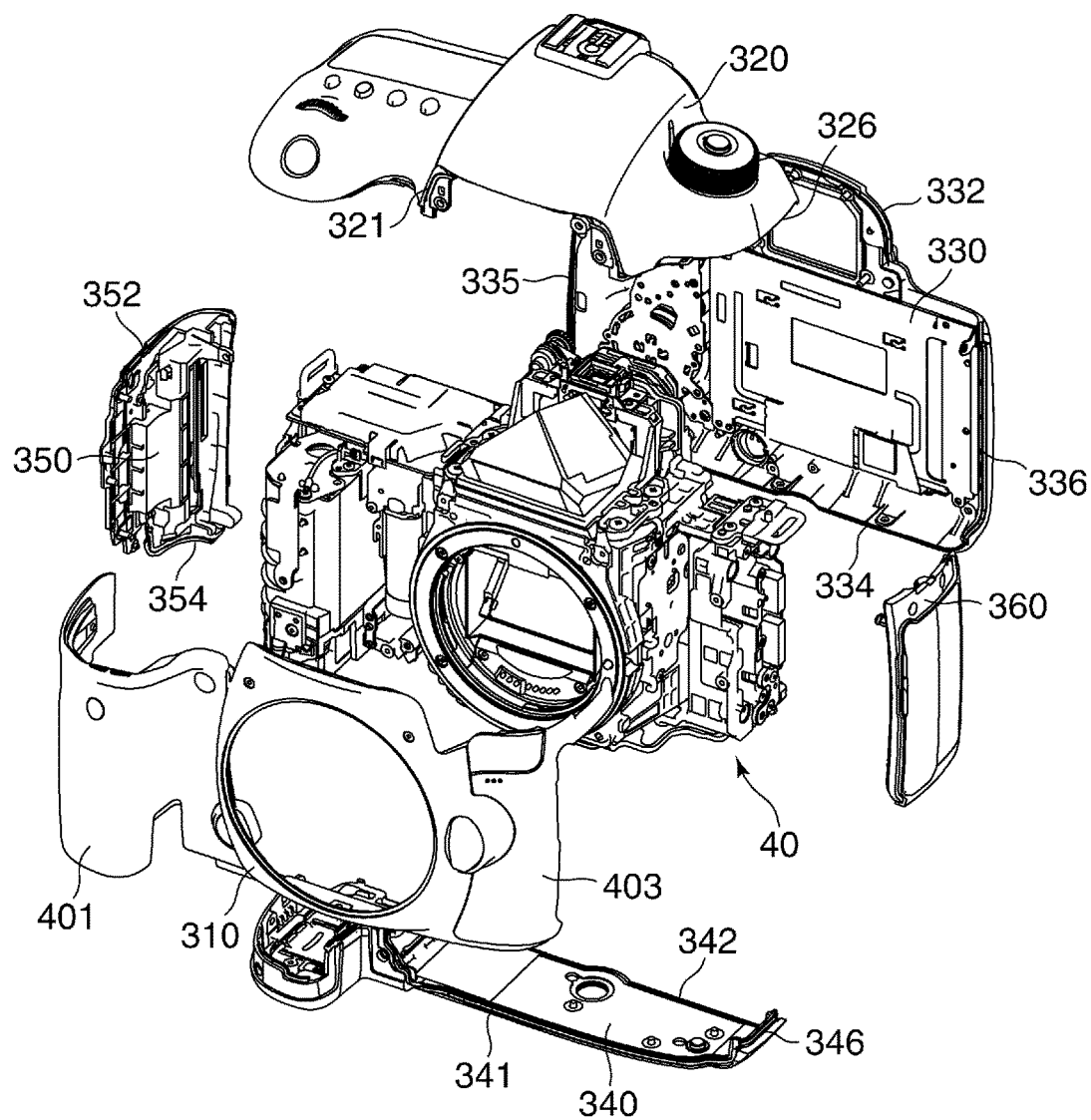
FIG. 2 is an exploded perspective view of the digital single-lens reflex camera shown in FIG. 1A.
Figure 3:
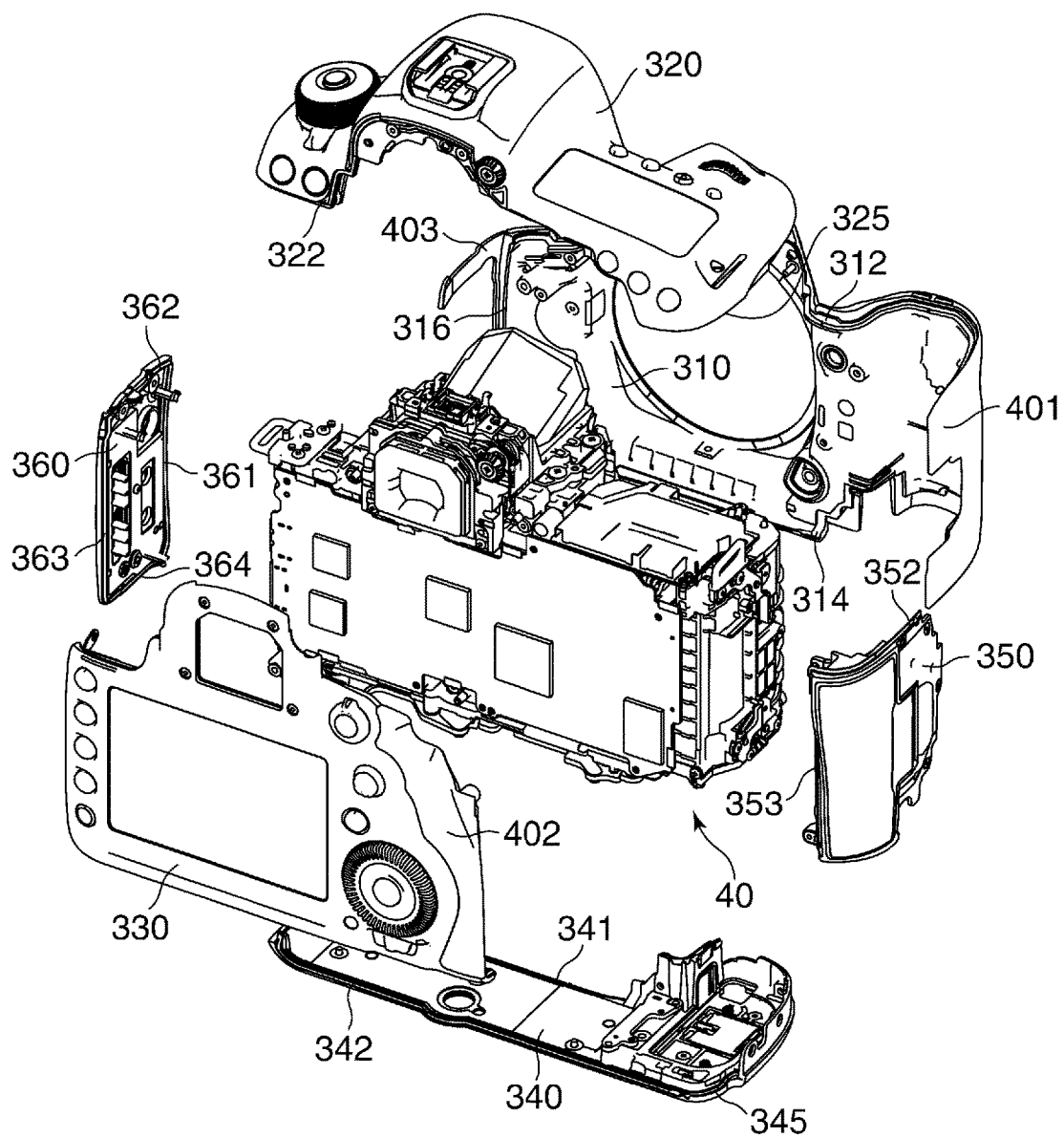
FIG. 3 is an exploded perspective view of the digital single-lens reflex camera shown in FIG. 1B.

FIG. 2 is an exploded perspective view of the camera 1 shown in FIG. 1A, and FIG. 3 is an exploded perspective view of the camera 1 shown in FIG. 1B.

As shown in FIG. 2 and FIG. 3, the camera 1 includes a main body unit 40, and a plurality of external covers covering the main body unit 40. The plurality of external covers comprise a front cover 310, an upper cover 320, a back cover 330, a bottom cover 340, a right cover 350, and a left cover 360. The front cover 310 has a right-front rubber 401 for improving a gripping performance by the whole of a right hand of the photographer and a left-front rubber 403 which is gripped by the photographer, and the back cover 330 has a back rubber 402 which is gripped by a right thumb of the photographer. The right-front rubber 401, the back rubber 402, and the left-front rubber 403 constitute examples of the "third external cover" according to the invention.

Each of the front cover 310, the upper cover 320, the back cover 330, and the bottom cover 340 is made of a magnesium alloy. The upper cover 320 has a seal member 321 and a seal member 322 pasted on a front side and a back side of the camera 1, respectively. The front cover 310 has an abutment section 312, abutting to the seal member 321, disposed thereon at a location corresponding to the seal member 321, and the back cover 330 has an abutment section 332, abutting to the seal member 322, disposed thereon at a location corresponding to the seal member 322.

The bottom cover 340 has a seal member 341 and a seal member 342 pasted on a front side and a back side of the camera 1, respectively. The front cover 310 has an abutment section 314, abutting to the seal member 341, disposed thereon at a location corresponding to the seal member 341, and the back cover 330 has an abutment section 334, abutting to the seal member 342, disposed thereon at a location corresponding to the seal member 342.

Assembling the covers 310, 320, 330, 340 to the main body unit 40 causes the seal members 321, 322, 341, 342 to be pressed against the abutment sections 312, 332, 314, 334 at their matching sections, respectively, which allows the matching sections of the covers 310, 320, 330, 340 to be sealed, respectively. Each of the seal members 321, 322, 341, 342 is made of a silicone sponge, for example.

The right cover 350 has a seal member 352 disposed on a side of the upper cover 320, a seal member 353 on a side of the back cover 330, and a seal member 354 on a side of the bottom cover 340. The upper cover 320 has an abutment section 325, abutting to the seal member 352, disposed thereon at a location corresponding to the seal member 352, and the back cover 330 has an abutment section 335, abutting to the seal member 353, disposed thereon at a location corresponding to the seal member 353. The bottom cover 340 has an abutment section 345, abutting to the seal member 354, disposed thereon at a location corresponding to the seal member 354.

The left cover 360 has a seal member 361 on a side of the front cover 310, a seal member 362 on a side of the upper cover 320, and a seal member 363 on a side of the back cover 330, a seal member 364 on a side of the bottom cover 340. The front cover 310 has an abutment section 316, abutting to the seal member 361, disposed thereon at a location corresponding to the seal member 361, the upper cover 320 has an abutment section 326, abutting to the seal member 362, disposed thereon at a location corresponding to the seal member 362. The back cover 330 has an abutment section 336, abutting to the seal member 363, disposed thereon at a location corresponding to the seal member 363, and the bottom cover 340 has an abutment section 346, abutting to the seal member 364, disposed thereon at a location corresponding to the seal member 364.

Assembling the covers 350, 360 to the main body unit 40 causes the seal members 352 to 354, and 361 to 364 to be pressed against the abutment sections 325, 335, 345, 316, 326, 336, 346 at their matching sections, respectively, which allows the matching sections of the right cover 350 and the left cover 360, and the other covers 310, 320, 330, 340 to be sealed, respectively. Each of the right cover 350 and the left cover 360 is formed using two-color formation with the seal members 352 to 354, 361 to 364 integrally formed, in which the primary formation material is made of a synthetic resin, and the secondary formation material is made of elastomer.

After the covers 310, 320, 330, 340, 350, 360 have been assembled to the main body unit 40, the right-front rubber 401 and the left-front rubber 403 are fixed to the front cover 310 using double-faced adhesive tapes, respectively, and the back rubber 402 is fixed to the back cover 330 using a double-faced adhesive tape.

Figure 4A:
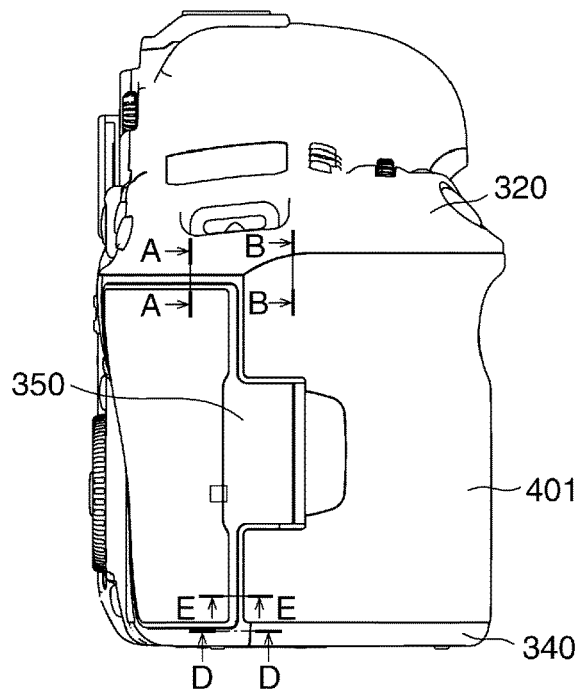
FIG. 4A is a side view of the digital single-lens reflex camera as viewed from a right cover.

A description will be given of a seal construction of the matching section of the upper cover 320 and the right cover 350 with reference to FIGS. 4A to 4B and FIGS. 5A to 5B. FIG. 4A is a side view of the camera 1 as viewed from the right cover 350, and FIG. 4B is a side view of the camera 1 with the right front rubber 401 removed.

Figure 4B:
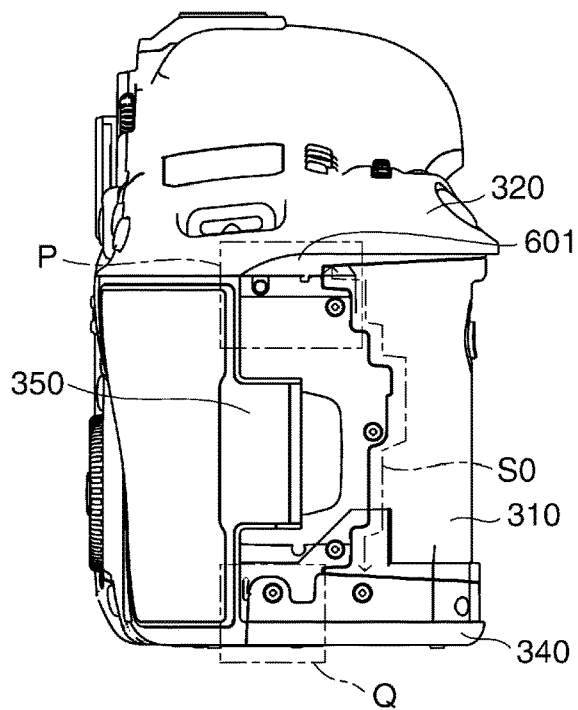
FIG. 4B is a side view of the digital single-lens reflex camera with a right front rubber removed.

As shown in FIGS. 4A to 4B, in a state where the right-front rubber 401 is removed, the front cover 310 and the right cover 350 have a fitting recess section 601, to which the right front rubber 401 is attached, formed on complementarily to a contour of the right-front rubber 401.

Figure 5A:
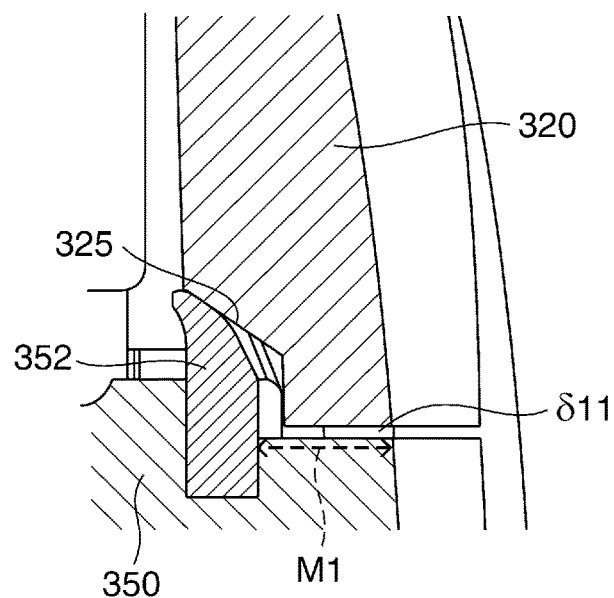
FIG. 5A is a sectional view taken along line A-A in FIG. 4A.

FIG. 5A is a sectional view taken along line A-A in FIG. 4A. As shown in FIG. 5A, the seal member 352 for the right cover 350 is depressed by the abutment section 325 of the upper cover 320 to thereby be compression-deformed while inclining on a side of the left cover 360, which allows the matching section of the upper cover 320 and the right cover 350 to be sealed.

The seal member 352 is disposed apart from an external surface of the upper cover 320 and the right cover 350 on a side of the left cover 360 by a distance M1, which prevents the seal member 352 from easily from outside of the upper cover 320 and the right cover 350. At a location shown by FIG. 5A, the right-front rubber 401 is not attached to the upper cover 320 and the right cover 350; accordingly, water enters a gap δ11 with a distance M1 from the seal member 352 to the external surface of the upper cover 320 and the right cover 350.

Figure 5B:
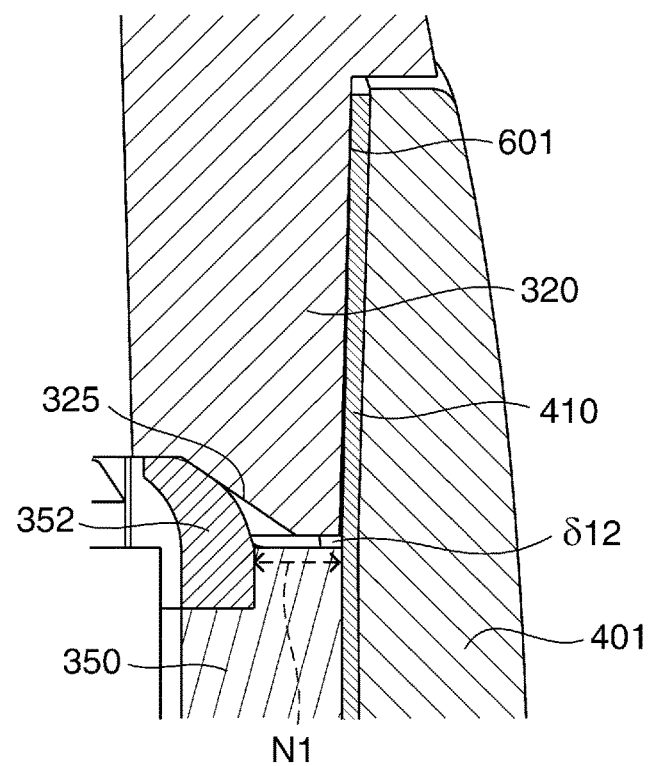
FIG. 5B is a sectional view taken along B-B in FIG. 4A.

FIG. 5B is a sectional view taken along B-B in FIG. 4A. As shown in FIG. 5B, the seal member 352 for the right cover 350 is, as is the case with FIG. 5A, depressed by the abutment section 325 of the upper cover 320 to thereby be compression-deformed while inclining on a side of the left cover 360, which allows the matching section of the upper cover 320 and the right cover 350 to be sealed. At a location shown by FIG. 5B, the right-front rubber 401 is fixedly adhered to the fitting recess section 601 formed on the upper cover 320 and the right cover 350 using a double-faced adhesive tape 410, which allows the double-faced adhesive tape 410 to seal a gap δ12 with a distance N1 of the matching section.

The gap δ12 with the distance N1 shown in FIG. 5B communicates with the gap δ11 with the distance M1 shown in FIG. 5A along the matching section; accordingly, water coming in through the gap δ11 with the distance M1 enters the gap δ12 with the distance N1 along the matching section. In this regard, according to the prior art, unless seal members are disposed at all the matching sections of the front cover 310, the upper cover 320, and the right cover 350 within an S0 zone shown in FIG. 4B out of a portion covered by the right-front rubber 401, the sealing performance cannot be realized.

Therefore, according to the present embodiment, by disposing a protruding portion 355 (refer to FIGS. 7A to 7C) on the seal member 352 of the right cover 350, the water entering the gap δ12 with the distance N1 through the gap δ11 with the distance M1 is kept back at the gap δ12 with the distance N1, which is described in detail with reference to FIG. 6 to FIG. 8B.

Figure 6:
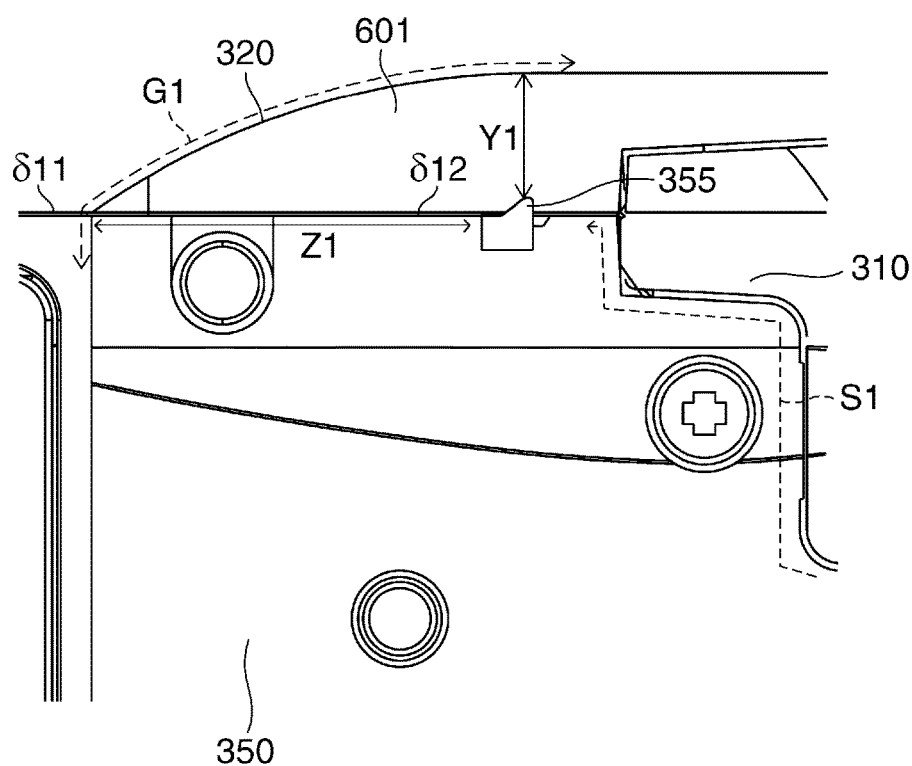
FIG. 6 is an enlarged view of a "P" part of FIG. 4B.

FIG. 6 is an enlarged view of a "P" part of FIG. 4B. As shown in FIG. 6, the fitting recess section 601 to which the right front-rubber 401 is attached is formed by assembling the upper cover 320, the front cover 310, and the right cover 350. The protruding portion 355 is disposed at a position apart from by a distance Z1 from an end of the fitting recess section 601 on a back side of the camera 1 and apart farthest from by a distance Y1 from an external end G1 of the right front rubber 401 in the height direction, that is, in the vicinity of the front cover 310 at a linear portion of the seal member 352.

A description will be given of a reason why the protruding portion 355 is disposed at a position apart from by the distance Z1 in the optical axis direction and apart from by the distance Y1 in the height direction. The matching section of the right cover 350, the front cover 310, and the upper cover 320 at the fitting recess section 601 is twisted up in a complicate manner at a portion shown by a broken line S1, which may deteriorate the seal performance when the seal member is fitted thereto, and may make, even if the seal member is of a pasting type, the pasting workability unstable.

As described using FIG. 5A, detruding the seal member 352 of the right cover 350 to the matching section 325 of the upper cover 320 ensures the seal performance for the matching section of the right cover 350 and the upper cover 320. In this regard, if the matching section of the external cover is twisted up, the fitting error of the external covers disadvantages the following capability of the seal member 352 and the abutment section 325, and hence may deteriorate the seal performance when the seal member is appropriately detruded. Accordingly, the matching section of the right cover 350 and the upper cover 320 has to have the protruding section 355 before reaching to the broken line portion S1 within the fitting recess section 601, preferably at a substantially straight portion of the matching section as show in FIG. 6.

To the fitting recess section 601 is fixedly adhered the right-front rubber 401. In this regard, the matching section of the external covers to which the seal member is not fitted (the broken line portion S1, for example) should be apart from the external end G1 of the right front rubber 401 as much as possible, which improves the seal performance. Accordingly, as shown in FIG. 6, the protruding portion 355 is disposed at a position apart farthest in the height direction, by the distance Y1 from the external end G1 of the right-front rubber 401. Therefore, the seal member 352 is disposed in the matching section of the external covers, to which the right front rubber 401 is attached, within a substantially straight portion thereof with the distance Z1 at which the height direction distance from the external end G1 of the right-front rubber 401 is not greater than the distance Y1, which improves the reliability of the seal performance.

Figure 7A:
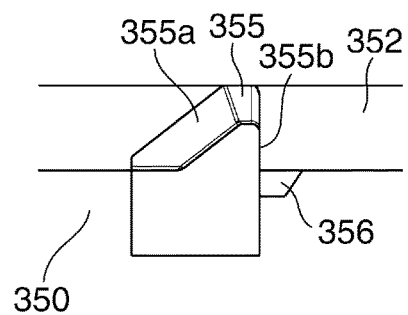
FIG. 7A is a side view of a protruding portion disposed on a right side of the camera as viewed from a back side of the camera.
Figure 7B:
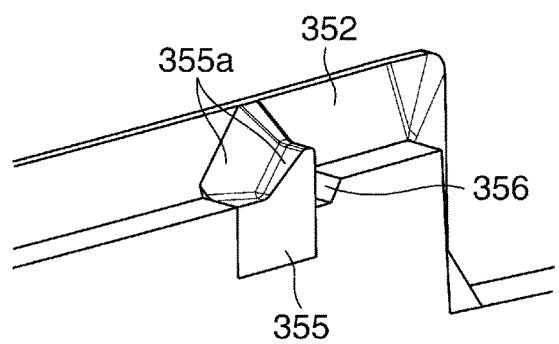
FIG. 7B is a perspective view of the protruding portion as viewed from a back side of the camera.
Figure 7C:
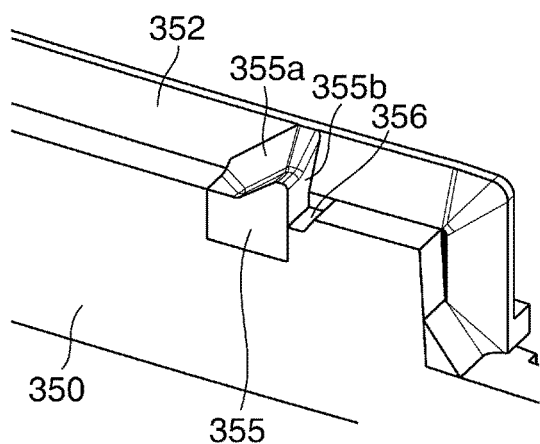
FIG. 7C is a perspective view of the protruding portion as viewed from a front side of the camera.

FIG. 7A is a side view of the protruding portion 355 disposed on a right side of the camera 1 as viewed from a back side of the camera 1, FIG. 7B is a perspective view of the protruding portion 355 as viewed from a back side of the camera 1, and FIG. 7C is a perspective view of the protruding portion 355 as viewed from a front side of the camera 1.

The protruding portion 355 is made of elastomer which is the same as the seal member 352 and integrally formed with the seal member 352. The protruding portion 355 protrudes, as shown in FIGS. 7A to 7C, from the seal member 352 toward a right side end of the camera 1 and fitted in the right cover 350 at a bottom end thereof. The protruding portion 355 has an inclined section 355a inclining downward from the front side to back side of the camera 1, and a vertical section 355b facing the front side of the camera 1.

The right cover 350 is molded by synthetic resin which is higher in rigidity than the seal member 352, and has a recess 356, on a front side of the camera 1 with respect to the protruding portion 355, that receives the protruding portion 355 when the protruding portion 355 is detruded on a front side of the camera 1. When the upper cover 320 is assembled to the right cover 350, the inclined section 355a is detruded on a side of the vertical section 355b due to the abutment of the upper cover 320, which causes the protrusion portion 355 to be received by the recess 356.

Figure 8A:
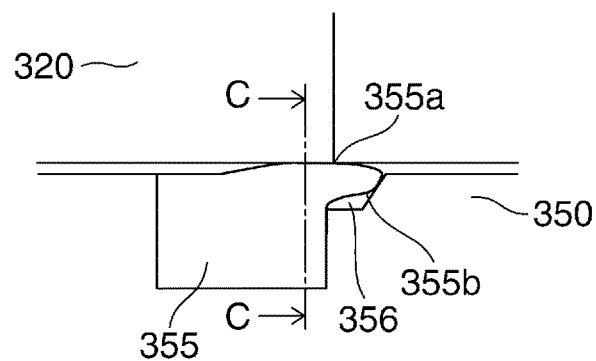
FIG. 8A is a right side sectional view of the upper cover and the right cover fitted to each other with the protruding portion deformed.
Figure 8B:
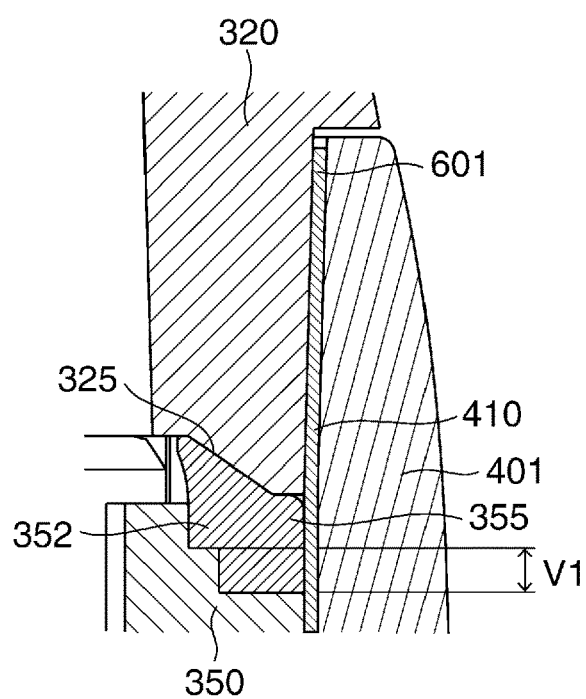
FIG. 8B is a sectional view taken along line C-C in FIG. 8A with the right front rubber fitted to a fitting recess section shown in FIG. 8A.

FIG. 8A is a right side view of the upper cover 320 and the right cover 350 fitted to each other with the protruding portion 355 deformed, and FIG. 8B is a sectional view taken along line C-C in FIG. 8A with the right front rubber 401 fitted to the fitting recess section 601 shown in FIG. 8A.

As shown in FIG. 8A, in a state where the upper cover 320 is assembled to the right cover 350, the protruding portion 355 is detruded on a front side of the camera 1 perpendicular to a side of the seal member 352 detruding, i.e., on a side of the left cover 360, thereby preventing the protruding portion 355 from projecting on an external side of the right cover beyond necessity, which causes the right front rubber 401 to be appropriately attached without protrusion. Further, the inclined portion 355a surely abuts to the upper cover 320 and the vertical portion 355b is received in the recess 356, which reduces repulsion of the protruding portion 355 to the upper cover 320.

Further, as shown in FIG. 8B, the protruding portion 355 is thickened by V1 than the seal member 352 in the thickness direction at a bottom portion thereof, which makes it easy for the protrusion portion 355 to be resiliently deformed in the thickness direction. Thus, when the upper cover 320 is assembled to the right cover 350, the protruding portion 355 is so constructed to reduce a repulsion force of the protrusion portion 355, which facilitates the assembling of the upper cover 320, and prevents retroflexion and misalignment of the upper cover 320.

As shown in FIGS. 5A to 5B, and FIG. 6, and FIG. 8B, water entering the gap $\delta 12$ with the distance N1 through the gap $\delta 11$ with the distance M1 is kept back by the protruding portion 355 disposed in the gap 612, which realizes the sealing performance without disposing the seal members at all the matching sections of the front cover 310, the upper cover 320, and the right cover 350 within the S0 zone shown in FIG. 4B out of a portion covered by the right-front rubber 401.

This eliminates the need for disposing the seal member in the matching sections of the zone S0 on a front side of the camera 1 out of the matching section of the right cover 350 and the front cover 310, at the fitting recess section 601 to which the right front rubber 401 is attached, which reduces the number of the parts and the assembling man-hour. Further, the seal member and the abutment section can be partially eliminated for the right cover 350 and the front cover 310, which downsizes the external covers and hence downsizes the camera 1 itself.

Figure 9A:
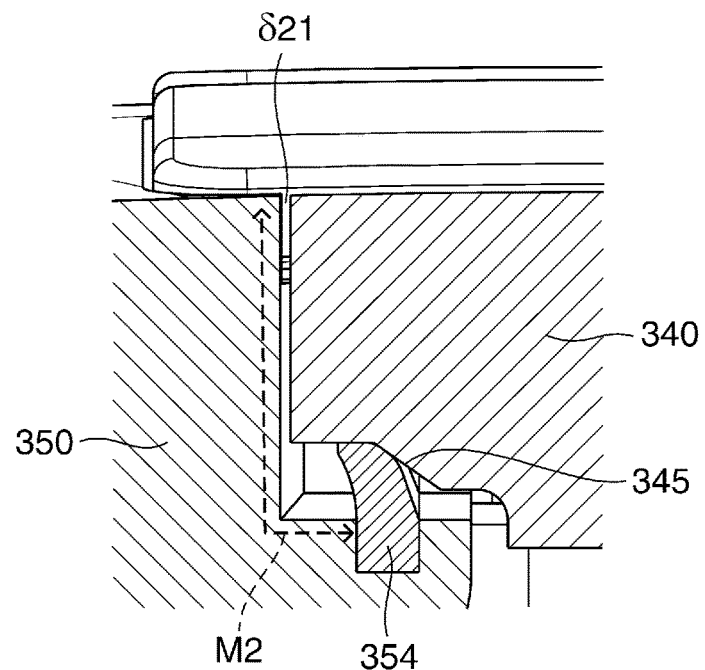
FIG. 9A is a sectional view taken along line D-D in FIG. 4A.

A description will be given of a seal construction of the matching section of the bottom cover 340 and the right cover 350 with reference to FIGS. 9A to 12B. FIG. 9A is a sectional view taken along line D-D in FIG. 4A, and FIG. 9B is a sectional view taken along E-E in FIG. 4A.

As shown in FIG. 9A, the matching section of the bottom cover 340 and the right cover 350 is sealed by the seal member 354 of the right cover 350 being compression-deformed in a state where the seal member 354 is detruded on a back side of the camera 1 by the abutment section 345 of the bottom cover 340. The seal member 354 is disposed inside by a distance M2 from an external end of the camera 1 at the matching section of the bottom cover 340 and the right cover 350, which prevents the seal member 354 to be seen from outside of the camera 1. In this regard, water enters a gap $\delta 21$ with a distance M2 (indicated by a broken line) outside of a portion of the abutment section 345 to which the seal member 354 abuts.

Figure 9B:
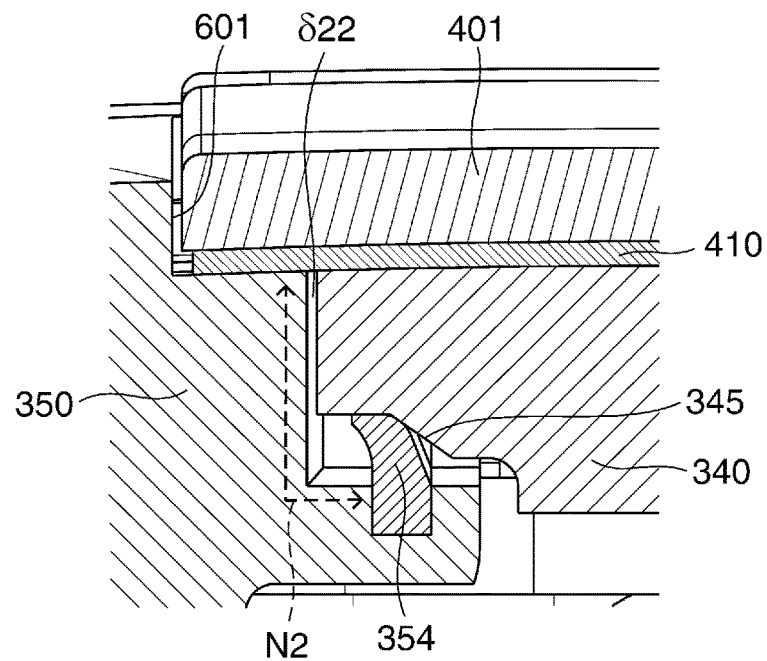
FIG. 9B is a sectional view taken along E-E in FIG. 4A.

FIG. 9B is a sectional view of a portion covered by the right-front rubber 401. The seal member 354 of the right cover 350 is, as is the case with FIG. 9A, compression-deformed in a state where the seal member 354 is detruded on a back side of the camera 1 by the abutment section 345 of the bottom cover 340, which satisfies the sealing performance. The right-front rubber 401 is fixedly adhered to the fitting recess section 601 using a double-faced adhesive tape 410, which allows the gap $\delta 22$ to be sealed by the double-faced adhesive tape 410 in FIG. 9B.

In this regard, the gap $\delta 22$ shown in FIG. 9B communicates with the gap $\delta 21$ shown in FIG. 9A; accordingly, water entering thorough the gap $\delta 21$ flows along the matching section to enter the gap $\delta 22$. Therefore, according to the present embodiment, the protruding portion 357 (see FIG. 10) is disposed on the seal member 354 of the right cover 350 to thereby keep back the water entering the gap $\delta 22$ through the gap $\delta 21$. The reason why will be described in detail with reference to with reference to FIGS. 6 to 8B.

Figure 10:
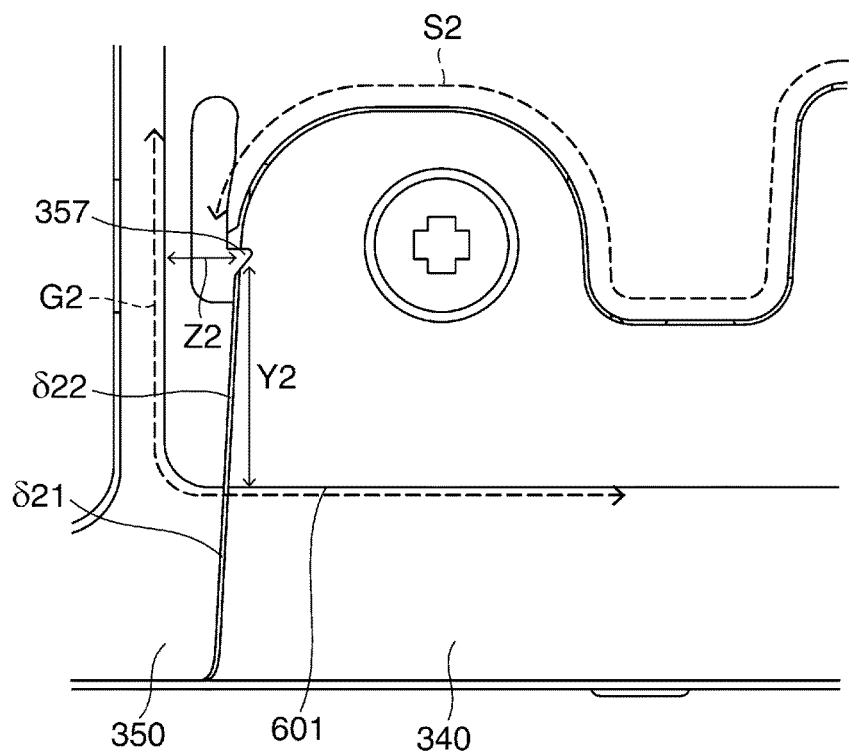
FIG. 10 is an enlarged view of a "Q" part of FIG. 4B.

FIG. 10 is an enlarged view of the matching section Q of the bottom cover 340 and the right cover 350 in FIG. 4B. As shown in FIG. 10, the fitting recess section 601 to which the right front rubber 401 is attached is formed by assembling the bottom cover 340 and the right cover 350 to each other. The protruding portion 357 is disposed at a position apart from by a distance Z2 on a front side of the camera 1 in the optical direction from an end of the fitting recess section 601 on a back side of the camera 1 and apart from by a distance Y2 in the height direction of the camera 1 from an end of the fitting recess section 601 on a bottom side of the camera 1.

A description will be given of a reason why the protruding portion 357 is disposed at a position apart from by the distance Z2 in the optical axis direction and apart from by the distance Y2 in the height direction. The matching section of the right cover 350 and the bottom cover 340 at the fitting recess section 601 is twisted up in a complicate manner at a portion shown by a broken line S2, which may deteriorate the seal performance when the seal member is fitted thereto, and may make, even if the seal member is of a pasting type, the pasting workability unstable. Accordingly, the matching section of the right cover 350 and the bottom cover 340 has to have the protruding section 357 before reaching to the broken line portion S2 within the fitting recess section 601, preferably at a substantially straight portion of the matching section as shown in FIG. 10.

To the fitting recess section 601 is fixedly adhered the right-front rubber 401. In this regard, the matching section of the external covers to which the seal member is not fitted (the broken line portion S2, for example) should be apart from the external end G2 of the right front rubber 401 as much as possible, which improves the seal performance. Accordingly, as shown in FIG. 10, the protruding portion 357 is disposed at a position apart farthest in the optical axis direction by the distance Z2 from the external end G2 of the right-front rubber 401. Therefore, the seal member 354 is disposed in the matching section of the external covers, to which the right front rubber 401 is attached, within a substantially straight portion thereof with the distance Z2 at which the optical axis direction-distance from the external end G2 of the right-front rubber 401 is not greater than the distance Y2, which improves the reliability of the seal performance.

Figure 11A:
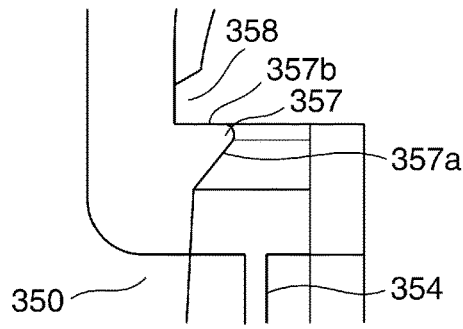
FIG. 11A is a side sectional view of the protruding portion disposed on a right side of the camera as viewed from a back side of the camera.
Figure 11B:
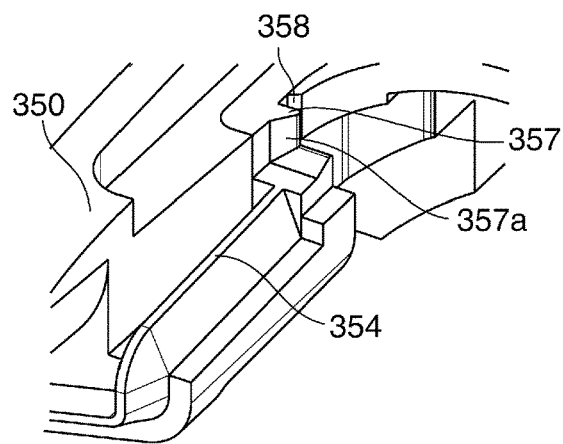
FIG. 11B is a perspective view of the protruding portion as viewed from a bottom side of the camera.
Figure 11C:
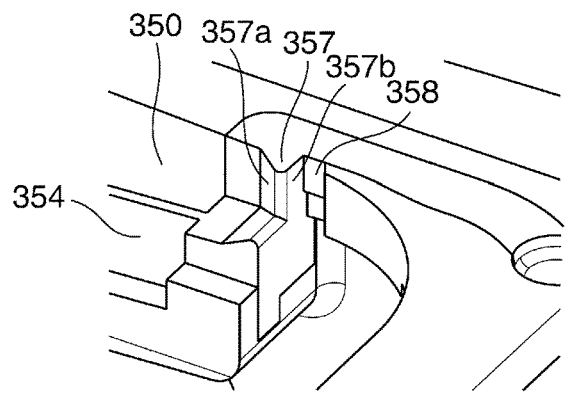
FIG. 11C is a perspective view of the protruding portion as viewed from an upper side of the camera.

FIG. 11A is a side sectional view of the protruding portion 357 disposed on a right side of the camera 1 as viewed from a back side of the camera 1, FIG. 11B is a perspective view of the protruding portion 357 as viewed from a bottom side of the camera 1, and FIG. 11C is a perspective view of the protruding portion 357 as viewed from an upper side of the camera 1.

The protruding portion 357 is made of elastomer which is the same, as the seal member 354 and integrally formed with the seal member 354. The protruding portion 357 protrudes, as shown in FIGS. 11A to 11C, from the seal member 354 toward a right side end of the camera 1. The protruding portion 357 has an inclined section 357a and a vertical section 357b facing the upper side of the camera 1.

The right cover 350 is molded by synthetic resin which is higher in rigidity than the seal member 354, and has a recess 358, on an upper side of the camera 1 with respect to the protruding portion 357, that receives the protruding portion 357 when the protruding portion 357 is detruded. When the bottom cover 340 is assembled to the right cover 350, the inclined section 357a is detruded due to the abutment of the bottom cover 340, which causes the protrusion portion 357 to be received by the recess 358.

Figure 12A:
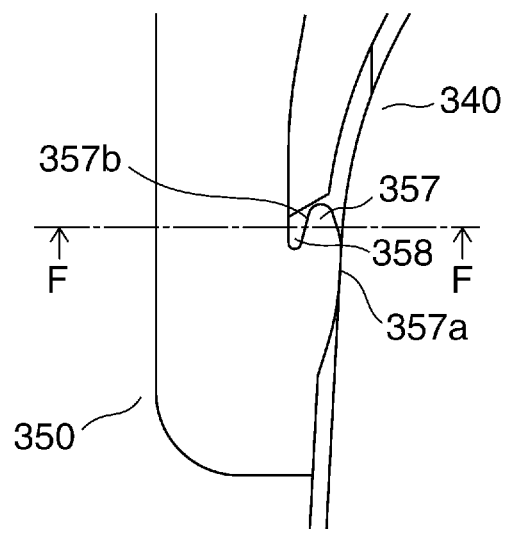
FIG. 12A is a right side sectional view of the right cover and the bottom cover fitted to each other with the protruding portion deformed.
Figure 12B:
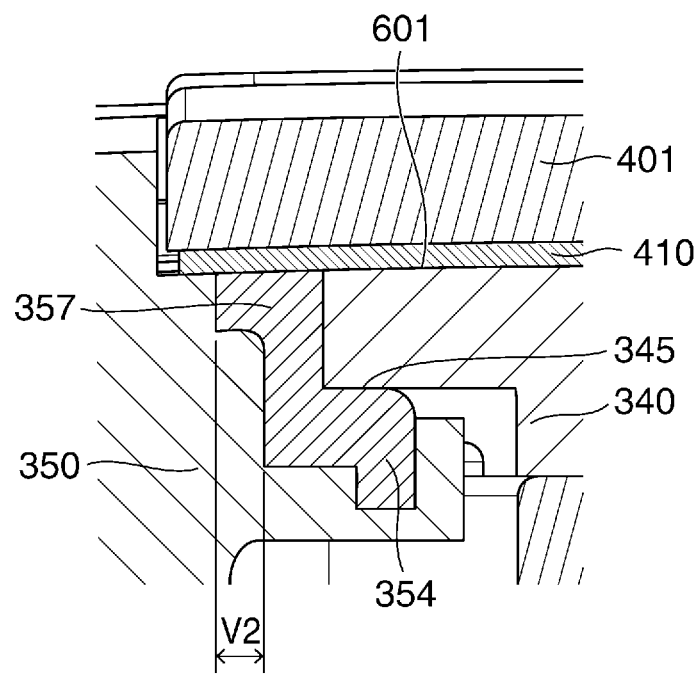
FIG. 12B is a sectional view taken along line F-F in FIG. 12A with the right front rubber fitted to the fitting recess section.

FIG. 12A is a right side view of the right cover 350 and the bottom cover 340 fitted to each other with the protruding portion 357 deformed, and FIG. 12B is a sectional view taken along line F-F in FIG. 12A with the right-front rubber 401 fitted to the fitting recess section 601.

As shown in FIG. 12A, in a state where the bottom cover 340 is assembled to the right cover 350, the protruding portion 357 is detruded on an upper side of the camera 1 perpendicular to a side of the seal member 354 detruding, i.e., on a back side of the camera 1, thereby preventing the protruding portion 357 from projecting on an external side of the right cover 350 beyond necessity, which causes the right front rubber 401 to be appropriately attached without protrusion.

The bottom cover 340 is assembled in such a direction as that the protruding portion 357 is detruded, which makes it easy for the protruding portion 357 to be received in the recess 358. In this regard, the inclined portion 357a surely abuts to the bottom cover 340 and the vertical portion 357b is received in the recess 358, which reduces repulsion to the bottom cover 340.

Further, as shown in FIG. 12B, the protruding portion 357 is thickened by V2 than the seal member 354 at a bottom portion thereof, which makes it easy for the protrusion portion 357 to be resiliently deformed in the thickness direction (toward a back side of the camera 1). Thus, when the bottom cover 340 is assembled to the right cover 350, the protruding portion 357 is so constructed to reduce a repulsion force of the protrusion portion 357, which facilitates the assembling of the bottom cover 340, and prevents retroflexion and misalignment of the upper cover 320.

As shown in FIGS. 9A to 10, and FIG. 12B, water entering the gap δ21 with the distance M2 through the gap δ22 with the distance N2 is kept back by the protruding portion 357 disposed in the gap δ22, which realizes the sealing performance without disposing the seal members at all the matching sections of the bottom cover 340 and the right cover 350 within the S2 zone shown in FIG. 10 out of a portion covered by the right front rubber 401.

This eliminates the need for disposing the seal member in the matching sections of the zone S2 on an upper side of the camera 1 out of the matching section of the right cover 350 and the bottom cover 340 at the fitting recess section 601 to which the right front rubber 401 is attached, which reduces the number of the parts and the assembling man-hour. Further, the seal member and the abutment section can be partially eliminated for the right cover 350 and the bottom cover 340, which downsizes the external covers and hence downsizes the camera 1 itself.

As described above, according to the present invention, it is capable of reducing the number of parts and the man-hours of the seal construction of the abutment section of the external covers, and ensuring a stable seal performance while realizing downsizing of the apparatus.

It should be noted that the constructions, such as material, shape, size, aspect, number, and arranged location of the invention may not be restricted to the exemplified embodiments and may be suitably changed as long as they are not deviated from the gist of the invention.

Other Embodiments

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-111697, filed Jun. 3, 2016, which is hereby incorporated by reference herein in its entirety.

What is claimed is:

1. An electronic apparatus comprising:
a first external cover;
a second external cover abutting to the first external cover through a matching section;
a seal member disposed at the matching section and adapted to seal the matching section;
a gap disposed at the matching section on an external side of the electronic apparatus with respect to the seal member; and
a third external cover fitted to the first external cover and the second external cover so as to partially cover the seal member disposed at the matching section and the gap,
wherein the seal member has, at a part of the gap partially covered by the third external cover, a protruding portion abutting to the third external cover to seal the part of the gap.

2. The electronic apparatus according to claim 1, wherein the matching section has a substantially linear part on which the protruding portion is disposed.

3. The electronic apparatus according to claim 1, wherein the protruding portion is disposed at a position apart farthest from an end of the third external cover.

4. The electronic apparatus according to claim 1, wherein the protruding portion is formed integrally with the seal member.

5. The electronic apparatus according to claim 1, wherein the protruding portion has an inclined section on an opposite side of the third external cover and a vertical section on a side of the third external cover, and the second external cover has a recess at the part of the gap so as to oppose to the vertical portion, the recess receiving the protruding portion when the first external cover and the second external cover are abutted to each other.

6. The electronic apparatus according to claim 1, wherein the seal member is detruded on an inner side of the electronic apparatus and the protruding portion is detruded on a side of the third external cover when the first external cover and the second external cover assembled to each other.

7. The electronic apparatus according to claim 1, wherein each of the first external cover and the second external cover is made of synthetic resin, the third external cover is made of rubber, and the seal member is made of elastomer.

8. The electronic apparatus according to claim 1, wherein the third external cover is fixedly adhered to the first external cover and the second external cover.

9. The electronic apparatus according to claim 3, wherein the protruding portion is disposed at a position apart farthest from an external end of the third external cover along the seal member.

* * * * *